United States Patent
Lebental et al.

(10) Patent No.: US 10,989,612 B2
(45) Date of Patent: Apr. 27, 2021

(54) SENSOR WITH A PLURALITY OF ACQUISITION DEVICES THAT MEASURE FORCE USING IMPEDANCE

(71) Applicants: INSTITUT FRANCAIS DES SCIENCES ET TECHNOLOGIES DES TRANSPORTS, DE L'AMENAGEMENT ET DES RÉSEAUX, Champs sur Marne (FR);

(Continued)

(72) Inventors: Berengere Lebental, Levallois Perret (FR); Boutheina Ghaddab, Bourg la Reine (FR); Vincent Gaudefroy, Vertou (FR); Eduardo Ruiz-Hitzky, Madrid (ES); Pilar Aranda Gallego, Madrid (ES); Cristina Ruiz Garcia, Madrid (ES); Birger Hennings, Chapel Hill, NC (US)

(73) Assignees: INSTITUT FRANCAIS DES SCIENCES ET TECHNOLOGIES DES TRANSPORT, DE L'AMENAGEMENT ET DES RESEAUX, Champs sur Marne (FR); CONSEJO SUPERIOR DE INVESTIGACIONES CIENTIFICAS, Madrid (ES); ECOLE POLYTECHNIQUE, Palaiseau (FR)

( * ) Notice: Subject to any disclaimer, the term of this patent is extended or adjusted under 35 U.S.C. 154(b) by 135 days.

(21) Appl. No.: 15/300,510

(22) PCT Filed: Mar. 27, 2015

(86) PCT No.: PCT/FR2015/050805
§ 371 (c)(1),
(2) Date: Sep. 29, 2016

(87) PCT Pub. No.: WO2015/150676
PCT Pub. Date: Oct. 8, 2015

(65) Prior Publication Data
US 2017/0138804 A1    May 18, 2017

(30) Foreign Application Priority Data

Mar. 31, 2014   (FR) ...................... 1452842

(51) Int. Cl.
*G01L 1/20*      (2006.01)
*G01G 19/02*   (2006.01)

(52) U.S. Cl.
CPC ............ *G01L 1/205* (2013.01); *G01G 19/021* (2013.01)

(58) Field of Classification Search
CPC ... G01L 1/205; G01L 1/22; G01L 1/18; E01C 19/00; G08G 1/02; E01F 11/00
See application file for complete search history.

(56) References Cited

U.S. PATENT DOCUMENTS

| 4,013,851 A | * | 3/1977 | Abbondante | .......... H01H 3/142 |
| | | | | 200/86 R |
| 4,383,239 A | * | 5/1983 | Robert | ...................... G08G 1/02 |
| | | | | 340/933 |
| 4,634,917 A | * | 1/1987 | Dvorsky | ................ G01B 7/004 |
| | | | | 310/323.21 |

(Continued)

FOREIGN PATENT DOCUMENTS

| CN | 1502166 | 6/2004 |
| CN | 102308375 | 1/2012 |

(Continued)

OTHER PUBLICATIONS

International Search Report issued in International application No. PCT/FR2015/050805 dated Jul. 21, 2015 (2 pages).

(Continued)

*Primary Examiner* — Tran M. Tran
(74) *Attorney, Agent, or Firm* — Hamre, Schumann, Mueller & Larson, P.C.

(57) ABSTRACT

An acquisition device includes a wall and a transducer constituted by a body on which electrodes are fastened spaced apart from one another. An electrical impedance of the transducer is variable as a function of deformation of the transducer. When looking in a direction perpendicular to a (Continued)

surface of the wall, at least two electrodes of the plurality of electrodes are spaced apart from each other. The transducer is incorporated under the surface of the wall.

16 Claims, 4 Drawing Sheets

(71) Applicants: CONSEJO SUPERIOR DE INVESTIGACIONES CIENTIFICAS, Madrid (ES); ECOLE POLYTECHNIQUE, Palaiseau (FR)

(56) References Cited

U.S. PATENT DOCUMENTS

| | | | | |
|---|---|---|---|---|
| 4,712,423 | A * | 12/1987 | Siffert | G01G 19/024 177/132 |
| 4,793,429 | A * | 12/1988 | Bratton | G01G 3/13 177/1 |
| 4,799,381 | A | 1/1989 | Tromp | |
| 4,839,480 | A * | 6/1989 | Bickley | G08G 1/02 200/86 A |
| 4,963,705 | A * | 10/1990 | Broderick | G08G 1/015 200/302.1 |
| 5,008,666 | A * | 4/1991 | Gebert | G08G 1/02 340/933 |
| 5,132,583 | A * | 7/1992 | Chang | G01B 7/18 252/62.9 R |
| 5,448,232 | A * | 9/1995 | Tyburski | E01F 11/00 200/86 A |
| 5,463,385 | A * | 10/1995 | Tyburski | E01F 11/00 200/86 A |
| 5,477,217 | A * | 12/1995 | Bergan | G08G 1/02 200/86 A |
| 5,510,812 | A * | 4/1996 | O'Mara | G01L 1/20 345/156 |
| 5,554,907 | A * | 9/1996 | Dixon | G08G 1/02 310/319 |
| 5,571,973 | A * | 11/1996 | Taylot | A61B 5/6892 73/862.046 |
| 5,668,540 | A * | 9/1997 | Bailleul | E01F 11/00 200/86 A |
| 5,710,558 | A * | 1/1998 | Gibson | G08G 1/02 200/85 R |
| 5,835,027 | A * | 11/1998 | Tyburski | G08G 1/02 340/933 |
| 5,883,585 | A * | 3/1999 | Akutsu | G08G 1/02 200/86 A |
| 5,979,230 | A * | 11/1999 | Balsarotti | G01L 5/288 73/121 |
| 6,121,869 | A * | 9/2000 | Burgess | H01H 3/141 200/511 |
| 6,137,424 | A * | 10/2000 | Cohen | E01F 11/00 340/933 |
| 6,301,544 | B1 * | 10/2001 | Sonderegger | B60C 23/06 340/933 |
| 6,469,266 | B2 * | 10/2002 | Taylor | E01F 11/00 200/86 A |
| 6,545,395 | B2 * | 4/2003 | Matsui | H01L 41/39 310/330 |
| 6,556,927 | B1 * | 4/2003 | Latta | G01G 19/024 177/210 EM |
| 6,737,953 | B2 * | 5/2004 | Serban | B60N 2/002 338/114 |
| 6,853,885 | B2 * | 2/2005 | Maeder | G08G 1/02 701/1 |
| 6,894,233 | B2 * | 5/2005 | Dingwall | G07B 15/00 177/210 C |
| 6,915,702 | B2 * | 7/2005 | Omura | G01L 1/18 73/777 |
| 7,042,369 | B2 * | 5/2006 | Hill | E01F 11/00 340/933 |
| 7,895,728 | B2 * | 3/2011 | Benslimane | H01L 41/0836 29/595 |
| 8,149,211 | B2 * | 4/2012 | Hayakawa | G01L 1/205 178/18.05 |
| 8,161,826 | B1 * | 4/2012 | Taylor | G01L 1/18 73/862.044 |
| 8,171,806 | B2 * | 5/2012 | Mizuno | G01L 9/0098 73/862.474 |
| 8,314,536 | B2 * | 11/2012 | Ito | G01L 1/16 310/365 |
| 8,413,519 | B2 * | 4/2013 | Weston | G01G 3/13 340/933 |
| 8,458,889 | B2 * | 6/2013 | Tsuchikawa | A61F 2/08 29/595 |
| 8,495,917 | B2 * | 7/2013 | Radivojevic | G01L 1/16 73/777 |
| 8,564,449 | B2 * | 10/2013 | Mitchell | G01M 5/0083 340/679 |
| 8,724,247 | B2 * | 5/2014 | Poorman | G11B 5/29 360/75 |
| 8,931,351 | B2 * | 1/2015 | Muramatsu | G01B 1/00 73/849 |
| 9,327,985 | B2 * | 5/2016 | Fugetsu | B82Y 30/00 |
| 9,664,717 | B2 * | 5/2017 | Choi | B25J 13/084 |
| 10,156,487 | B2 * | 12/2018 | Choi | G01L 5/00 |
| 10,620,062 | B2 * | 4/2020 | Chung | G01N 33/383 |
| 2006/0137913 | A1 * | 6/2006 | Dicko | G01G 7/02 177/1 |
| 2010/0126273 | A1 * | 5/2010 | Lim | G01P 15/123 73/514.16 |
| 2011/0227836 | A1 | 9/2011 | Li et al. | |
| 2012/0090409 | A1 * | 4/2012 | Luthje | G01P 3/48 73/862.627 |
| 2017/0350772 | A1 * | 12/2017 | DeGanello | H01B 1/24 |

FOREIGN PATENT DOCUMENTS

| | | | |
|---|---|---|---|
| CN | 102549662 | 7/2012 | |
| EP | 0218465 | 4/1987 | |
| EP | 2482051 | 8/2012 | |
| JP | S54148885 | 10/1979 | |
| JP | H04315015 | 11/1992 | |
| JP | H1078357 | 3/1998 | |
| JP | H11148852 | 6/1999 | |
| JP | 2002039874 | 2/2002 | |
| JP | 2002343208 | 11/2002 | |
| JP | 2003139630 | 5/2003 | |
| JP | 2005096595 | 4/2005 | |
| JP | 2011213342 | 10/2011 | |
| WO | 2011074125 | 6/2011 | |
| WO | WO-2011070208 A1 * | 6/2011 | B82Y 40/00 |
| WO | 2012160229 | 11/2012 | |

OTHER PUBLICATIONS

Written Opinion issued in International application No. PCT/FR2015/050805 dated Jul. 21, 2015 (6 pages).
Office Action issued in counterpart Japanese Patent Application No. 2016-560012, dated Jun. 18, 2019, 8 pages including English translation.
Office Action issued for counterpart Japanese Patent Application No. 2016-560012, dated Sep. 11, 2018, 12 pages including English translation.
Written Opinion issued for counterpart Singaporean Patent Application No. 11201608066P, dated Mar. 13, 2019, 6 pages.
Han, B. et al., "A self-sensing carbon nanotube/cement composite for traffic monitoring," Nanotechnology; Oct. 7, 2009; IOP Publishing; pp. 1-5.
Office Action issued for related Chinese Patent Application No. 201580028527.8, dated Jun. 14, 2019, 16 pages including English translation.
Office Action issued for Brazilian Patent Application No. 112016022633-0, dated Apr. 7, 2020, 4 pages.

* cited by examiner

SENSOR WITH A PLURALITY OF ACQUISITION DEVICES THAT MEASURE FORCE USING IMPEDANCE

A first aspect of the invention relates to a transducer for detecting and/or measuring force when it is integrated in a force sensor; in which transducer the applied force is not measured directly, but is measured by measuring deformation: under the effect of a force, the transducer suffers deformation; this deformation leads to a variation in a measurable magnitude of the transducer; a measurement portion of the sensor detects and/or quantifies the variation, and delivers an output signal representative of the deformation and consequently of the applied force.

Naturally, such a transducer can also be used for detecting or measuring deformation.

A first application of such transducers and sensors lies in weighing vehicles on a roadway, when stationary, or preferably while moving.

When a vehicle is on a roadway, whether stationary or moving, the roadway deforms locally under its tires. This deformation, which is a function amongst other things of the weight of the vehicle, can be detected and/or measured by a sensor or an array of sensors. This deformation information can then be interpreted in order to detect the presence of vehicle wheels and to determine the number of vehicle wheels present or traveling on the roadway, their speed, and/or their travel direction, or indeed their weight.

A second application lies in tracking the state of the roadway, e.g. tracking irreversible deformation of the roadway and/or detecting cracks and/or anticipating cracks, e.g. by analyzing any drift in the measurement(s) from the sensor(s), whether obtained in the absence of a vehicle or aggregated after the passage of a plurality of vehicles.

BACKGROUND OF THE FIRST ASPECT OF THE INVENTION

Numerous deformation or force sensors have been developed for applications of weighing stationary or moving vehicles on a roadway, and for tracking the state of the roadway.

In some such sensors, the transducer is formed by a body that has electrodes fastened thereon, and that is made of a material such that when a pair of electrodes are fastened on the material, the resistance between the electrodes varies as a function of the deformation suffered by the material (i.e. a piezoresistive material).

The specific nature of such sensors is that the electrodes are fastened on opposite sides of said body on faces of the body that are normal, i.e. perpendicular, to the direction in which the force for measuring is applied.

When the force is applied to the transducer, the body deforms in this direction; consequently, the resistance measured between the electrodes on the faces that are normal to the applied force varies; this variation of resistance is detected and/or measured by the sensor in order to provide the looked-for information.

Such transducers may be made for example in the form of "intelligent concretes" or "intelligent bituminous mixes", i.e. concretes or bituminous mixes that are filled with nano-particles and that present piezoresistive behavior. They can also be made by means of piezoresistive polymers.

There also exist transducers that are made in the form of piezoresistive tapes, in particular based on polymers, ceramics, and piezoresistive crystal materials.

Nevertheless, those various transducers are not entirely satisfactory since each of them raises the following problems at least in part:

the long duration required for putting transducers into place and thus the long time the roadway is made unavailable;

the lack of reliability of such transducers in the medium to long term, due to incompatibilities between the materials of the transducers and filler materials with the material of the roadway, the transducers being subjected to stresses that are very large and repeated;

the damage caused to the roadway by using transducers, given that they have height that is not negligible, thereby reducing the lifetime of the roadway in the vicinity of the sensors;

the poor accuracy of the transducers, which is affected by the speeds of the vehicles and the paths they follow, and by variations in temperature and in moisture; and finally, large costs due both to the price of the transducers and to the cost of putting them into place in the roadway.

OBJECT AND SUMMARY OF THE FIRST ASPECT OF THE INVENTION

A first object of the invention is to propose a transducer and consequently a deformation or force sensor capable of eliminating or reducing all or some of the above-mentioned drawbacks.

This first object is achieved by an acquisition device comprising a wall and a transducer, in which device the transducer is constituted by a body and a plurality of electrodes fastened to said body and spaced apart from one another; the transducer is such that an electrical impedance determined from said plurality of electrodes is variable as a function of deformation to which the transducer is subjected; when seen looking along a direction perpendicular to a surface of the wall, at least two electrodes of said plurality of electrodes are spaced apart from each other; and the transducer is incorporated under the surface of the wall.

The term "wall" is used to designate a body (or a set of bodies) defined by a surface that is free, i.e. a surface having one of its sides in a fluid, and in particular the atmosphere. A wall may optionally be flexible, as with a textile. A wall is not necessarily plane.

The fact that the transducer is incorporated under the surface of the wall means firstly that when looking in a direction perpendicular to the surface of the wall, the wall surrounds the transducer, and secondly that the transducer is placed on the wall side relative to the surface of the wall (nevertheless, the transducer may optionally itself be defined by the surface of the wall).

The only impedance mentioned in the present document is electrical impedance; consequently it is referred to below merely as "impedance".

An impedance determined from a plurality of electrodes is a magnitude that is a function of at least one ratio between a voltage and a current; for each ratio among said at least one ratio, the voltage is measured between a first electrode pair of said plurality of electrodes and the current is applied to a second electrode pair of said plurality of electrodes. The first and second electrode pairs may be identical or different.

Usually, the impedance is conventionally equal to the ratio of the voltage and the current for a single pair of electrodes.

The term "impedance" may also refer to "mean resistance", equal to the mean slope (e.g. as determined by linear regression) of the (straight-line) curve plotting current as a function of voltage (or voltage as a function of current).

In the above defined acquisition device, the surface of the wall includes the surface that is to receive the force that is to be detected or measured.

When this force is applied to the surface of the wall, that leads to a deformation of the transducer. This deformation leads to a variation of the electrical impedance between the electrodes, which can be measured. Measuring the deformation of the transducer (by measuring the impedance variation between electrodes) thus serves to measure the force applied to the wall.

An acquisition device may have a plurality of transducers of the above-defined type.

Unlike previously-used transducers, in the acquisition device of the invention, the electrodes of the transducer are not in alignment in the direction in which the force is applied, but on the contrary, when seen looking along a direction perpendicular to the surface of the wall, at least one pair of electrodes are spaced apart: i.e., when looking in this direction, the two electrodes do not overlap and are seen to be disjoint. This arrangement advantageously makes it possible for at least these electrodes optionally to be placed at the same level in the direction perpendicular to the surface, thus making it possible to have an acquisition device that is more compact in this direction, or indeed extremely compact.

By way of example, the acquisition device can thus be included in the surface of a roadway in a manner that intrudes very little.

Below, the term "thickness" is used relative to the acquisition device to designate its dimension in the direction perpendicular to the surface of the wall, which direction is referred to as the "perpendicular direction".

In general, the body of a transducer of the invention is of small thickness.

There is no need for the transducer to be arranged at the surface of the wall: it may be situated at a distance from that surface.

Consequently, in an embodiment of the invention, the acquisition device may further comprise a transfer layer separating the transducer from the surface of the wall. On being deformed, this transfer layer leads to corresponding deformation of the transducer, which deformation is representative of the force applied to the surface of the wall.

Preferably, the transfer layer adheres to the face of the transducer that is situated beside the surface, i.e. the top face if the transducer is arranged horizontally.

The transfer layer preferably presents thickness that is greater than three times the dimension of the transducer body in the perpendicular direction.

The transfer layer may optionally be laminated and may itself be made out of at least two sub-layers.

The transfer layer may in particular be arranged in such a manner as to deform specifically in a transverse plane perpendicular to the direction in which the force is applied. Under such circumstances, the transfer layer converts the applied force into a "transverse" deformation of the transducer taking place in this transverse plane; and it is this transverse deformation that creates a measurable impedance variation between electrodes.

The transfer layer may also be arranged in such a manner that the applied force gives rise to deformation of the transducer in the perpendicular direction, and the transducer may be designed so that such deformation suffices to create a measurable impedance variation between electrodes.

The transfer layer may also be arranged to combine both effects.

The transfer layer and the wall may be made of the same material, in particular bituminous mix. It should be understood that in the above sentence, the term "wall" designates the portion of the wall that surrounds the transducer (when seen looking along the perpendicular direction).

The transfer layer and the wall may in particular be formed integrally. The fact that the transfer layer and the wall are formed integrally means that the transfer layer is then formed continuously with the material of the wall portion surrounding the transducer.

Alternatively, the transfer layer is made of a material that is applied after the wall has been formed, when the transducer is placed in a hole formed in a wall.

The above defined acquisition device may be used to make a sensor, in particular a sensor for detecting or measuring the deformation of the transducer, and/or the force applied to the wall.

The sensor may also be designed to indicate the variations in the force applied to the surface of the wall (rather than the force itself), which variations are then generally determined as a function of the impedance variations of the transducer.

The sensor then has at least one acquisition device as defined above, and an impedance-determination system connected to electrodes of at least one transducer of said at least one acquisition device, and suitable for determining an impedance and/or an impedance variation of said at least one transducer.

In particular, the sensor may comprise a set of transducers arranged in an array, together with means suitable for identifying which transducers are activated or stressed at any given instant. A sensor including such an array of transducers may be used for measuring the speed and/or the travel direction of a vehicle. In particular, the transducers may be arranged in rows and columns, i.e. in a matrix arrangement.

In an embodiment, the sensor may include two (or more than two) transducers, placed one above the other in the thickness direction of the sensor.

Under such circumstances, when seen looking perpendicularly to the surface of the wall of the acquisition device, the respective electrodes of the various transducers may in particular present orientations that are different; for example, in this view they may be at an angle of 90°.

The impedance-determination system may be a system for determining resistance, constituted mainly by an ohmmeter that detects and/or quantifies the resistance and/or the resistance variation between the electrodes.

In another embodiment, the impedance-determination system evaluates the complex impedance between the electrodes, possibly as a function of frequency or at a predefined frequency, e.g. for the purpose of determining the capacitance and the relative permittivity of the material between the electrodes.

The sensor may also comprise a correlation system for determining the deformation of the transducer(s), and/or the force(s) applied to the wall, on the basis of the impedance of the transducer(s) and/or impedance variations.

On the basis of information delivered by the impedance-determination system, the correlation system prepares an analog or digital output signal that is quantitatively or qualitatively correlated with the deformation of the transducer(s) or with the force(s) applied to the surface of the wall. The correlation between the impedance or the impedance variations between the electrodes and the output signal (considered as being representative of the deformation or of the applied force) is determined by means of a preliminary calibration step and/or by an (electromechanical) physical model for the acquisition device.

The sensor may also be a sensor for sensing the deformation state of the roadway or of the material that receives the sensor, and in particular irreversible deformation of a roadway, together with a system for anticipated detection of cracks. By way of example, the sensor may comprise at least one acquisition device as defined above, together with an ohmmeter connected to electrodes of the transducer(s), or a matrix of transducers as defined above. By way of example, the sensor operates by analyzing any drift in the measurements from the transducer(s), either for measurements obtained in the absence of vehicles or for measurements aggregated as a result of a plurality of vehicles passing.

The sensor may also be a sensor for sensing the speed and the direction of an object moving on a material, comprising at least one acquisition device as defined above, together with an ohmmeter connected to electrodes of the transducer(s), or preferably of a matrix of transducers as defined above.

The acquisition device or the sensor of the invention may be used equally well for detecting a localized force (spot pressure) and for detecting a distributed force.

As mentioned above, the transducer is generally of small thickness. The transducer body is thus generally in the form of a layer, or of one (or more) thread(s) or strip(s) connecting together the electrodes.

By way of example, the transducer body may form a thin layer, i.e. a layer of thickness less than one-tenth of at least one of the other two characteristic dimensions of the body of the transducer. The thickness of this layer may in particular be less than 1 millimeter (mm), preferably less than 0.5 mm, or even 0.1 mm.

The electrodes are generally arranged in such a manner as to be at the same level relative to the body of the transducer in the direction perpendicular to the surface. For example, the electrodes may be placed on the face of the transducer body that is situated beside the surface, and on its face that is remote from the surface, or indeed at a common level between them.

These faces are the top and bottom faces of the transducer body, when the device is arranged "horizontally", i.e. in such a manner that the surface of its wall is horizontal (with this being one possibility among others for installing the acquisition device of the invention. Conventionally, an element is said below to be a "top" element when it is situated beside the surface of the wall relative to the body of the transducer, and a "bottom" element when it is situated on the opposite side.

As mentioned above, an important application of the invention is weighing vehicles or measuring deformation of the roadway.

The acquisition device is then implanted under the surface of the roadway. Its small thickness enables it to be implanted in a manner that intrudes little. As described in greater detail below, it may be made using materials that are compatible with bituminous mix.

Consequently, in spite of numerous stresses (climate, mechanical, . . . ) to which an acquisition device implanted in a roadway might be subjected, the acquisition device of the invention can advantageously present a long lifetime.

The acquisition device, or a sensor incorporating such a device, may naturally be used for detecting the presence and the weight of objects (or of people, animals, etc.) on a surface, or indeed any forces that might be applied to a surface.

In order to increase the lifetime and the accuracy of the transducer, it may further comprise a bonding layer interposed between the body of the transducer and a surface neighboring the body of the transducer, the bonding layer adhering to the body of the transducer and to said neighboring surface. This neighboring surface may in particular be a surface of the above-mentioned transfer layer. The bonding layer is then a top bonding layer, that provides close bonding between the transfer layer and the body of the transducer.

This neighboring surface may also be a support surface supporting the transducer on its bottom side; the bonding layer is then a bottom bonding layer, arranged between the piezoresistive body and the support surface.

The transducer may have both a bottom bonding layer and a top bonding layer.

In an embodiment, the transducer also has a second pair of electrodes that are spaced apart from each other in a second direction perpendicular to the transverse direction (the transverse direction being the direction along which the electrodes of the above-mentioned pair of electrodes are spaced apart, which electrodes are referred to as the first pair of electrodes). The second pair of electrodes makes it possible to provide an additional measurement, and thereby obtain better knowledge about the variations in the impedance of the piezoresistive body, and by extension, about the state of its deformation.

In an embodiment, the transducer has several pairs of electrodes forming parallel pairs of sides of a polygon. The sides of the polygon that are not parallel to each other may be of different lengths. The pairs of electrodes make it possible to obtain better knowledge about the resistance of the transducer because of the directions and the shapes selected for the electrodes, and by extension, to obtain better knowledge about the state of deformation of the body of the transducer.

The electrodes may benefit in full or in part from the following improvements:
  the pair of electrodes may be constituted by electrodes that are interleaved (i.e. that form two interfitting combs) so as to reduce the resistance of the transducer and increase its sensitivity;
  the portions of the electrodes that are in contact with the piezoresistive body may be substantially plane;
  the portions of the electrodes that are in contact with the piezoresistive body may be made up of a thin wire or an array of thin wires forming a comb or a grid, which may optionally be regular;
  the electrodes may be rigid, example they may be made of a material having a bending modulus that is significantly greater (at least twice) than the bending modulus of the piezoresistive body. This arrangement makes it possible to increase the sensitivity of the transducer to deformation perpendicular to the surface of the wall; and
  the electrodes may be flexible, and by way of example they may be made of a material having a bending modulus that is comparable with or less than the bending modulus of the piezoresistive body. This arrangement makes it possible to increase the robustness of the transducer.

Various materials can be used to make the piezoresistive body.

In order to be able to measure a force applied to the surface of the wall, it is necessary for the impedance of the piezoresistive body (i.e. generally its electrical resistance) between the electrodes, and thus in the transverse direction, to vary—and preferably strongly—as a function of the applied force.

In order to make the transducer, it is possible in particular to make use of a body and electrodes that present one and/or more of the following characteristics:

if a force is applied to the acquisition device in a direction perpendicular to the surface of the wall, the transducer deforms mainly, or indeed essentially, in said direction perpendicular to the surface of the wall, and an impedance measured between the electrodes of said plurality of electrodes varies.

Optionally, this impedance variation occurs even in the absence of the material being deformed in said perpendicular direction.

if a force is applied to the acquisition device in a direction perpendicular to the surface of the wall, the transducer deforms mainly, or indeed essentially, in a plane substantially parallel to the wall, and an impedance measured between the electrodes of said plurality of electrodes varies.

Deformation occurring "mainly" (or indeed essentially) in a direction means that the movements of points of the material take place in a direction making an angle of less than 45° (or indeed less than 20°) relative to said direction. The above-mentioned characteristics may be obtained by an appropriate selection of piezoresistive material for forming the body of the transducer, and/or by selecting electrodes having appropriate stiffness.

An example of transducers presenting these characteristics is given below.

The transducer body may have various different chemical compositions.

In an embodiment, the transducer body comprises a percolating array of micro- and/or nano-particles. The terms "micro-particles" and "nano-particles" are used herein respectively to designate particles for which at least one of the characteristic dimensions is less than 100 micrometers (μm) or 100 nanometers (nm), respectively.

These micro- and/or nano-particles may in particular comprise one or more particles selected from the following list:

a) carbon nanotubes, in particular in a random or an organized array;

b) self-assembled micro- or nano-particles; and c) sheets of graphene, of graphite, or of optionally reduced graphene oxide.

The percolating array may also include particles of clay, some of said particles presenting an outside surface that is covered at least in part in a conductive substance.

The transducer body may also comprise a piezoresistive polymer, or a mixture of a plurality of piezoresistive polymers, or a mixture of at least one polymer, e.g. bitumen, with conductive micro- and nano-particles (thus forming a polymer composite with micro- or nano-particles) or a mixture of cement material with micro- and nano-particles (sometimes referred to as "intelligent cement" or "intelligent concrete").

The invention also provides a tape comprising a plurality of acquisition devices as defined above fastened to a strip. The strip may be made of a flexible polymer. In particular, it may be designed to be capable of being packaged as a reel or a roll. The strip may act as a transfer layer and/or as a layer presenting a support surface for the purpose of protecting or supporting the acquisition devices, as set out above.

The invention also provides an inspection station, e.g. a tollbooth, having at least one traffic lane provided with a force sensor as defined above.

The invention also provides a display, e.g. a touchscreen, suitable for displaying variable information and including at least one acquisition device as defined above.

The invention also provides a method of measuring force, the method comprising the following steps:

a) providing a transducer constituted by a body and by a plurality of electrodes fastened to said body and spaced apart from one another, the transducer being such that an electrical impedance determined from said plurality of electrodes is variable as a function of deformation to which the transducer is subjected;

b) applying a force to said transducer in a direction such that, when seen looking along said direction, at least two electrodes of said plurality of electrodes are spaced apart from each other; and c) measuring the variation of the impedance under the effect of the applied force.

d) determining the applied force as a function of said impedance variation.

Step d) is performed by using prior knowledge about the relationship between the deformation of the transducer and the force applied thereto.

It can also be understood that the force may be applied to the transducer either directly or indirectly. For example, the transducer may be placed under a transfer layer (a force transfer layer), and a force may be applied to the transfer layer, with a portion of this force being transmitted to the transducer via the transfer layer.

A second object of the invention is to provide a method of fabricating a transducer incorporated in a wall, which method enables a transducer to be incorporated in simple manner in a wall in order to detect and/or measure deformations and forces, and in particular a transducer usable in a force sensor for measuring a force applied to a roadway.

This object is achieved by the method of fabricating an acquisition device comprising a wall and a transducer, the method comprising the following steps:

a) positioning a plurality of electrodes in contact with a body, the body and said electrodes being such that an electrical impedance determined from said plurality of electrodes is variable as a function of deformation to which the body associated with said plurality of electrodes is subjected;

the body and said plurality of electrodes thus form a transducer;

b) forming the wall; and wherein steps a) and b) are performed in such a manner that the transducer is incorporated under a surface of the wall, and, when seen looking along a direction perpendicular to said surface, at least two of said electrodes are spaced apart from each other.

This method may be performed in particular when the wall is the ground or the wall of a ground.

In this method, step b) is preferably performed after step a), i.e. after making the transducer or incorporating it under the surface of a wall.

Step a) may comprise two sub-steps: a1) positioning the electrode; a2) forming the body of the transducer.

These two sub-steps may be performed in the order a1) followed by a2), if the body of the transducer is above the electrodes, or in the order a2) followed by a1) under opposite circumstances, or indeed simultaneously, in particular if the electrodes are inside the body of the transducer.

At the end of step b), the top surface of the body of the transducer constitutes a wall surface. The method thus makes it possible to obtain an acquisition device comprising a transducer incorporated in a wall in accordance with the invention.

Step b) of the method may in particular include depositing a transfer layer on the transducer. Preferably, this transfer layer is designed so as to adhere to the transducer.

The above-described method of fabricating a transducer may be performed in a factory; the transducer is then prefabricated. The body of the transducer formed in step a) can then be formed in particular on a top surface of a tape, e.g. a tape made of plastics material.

Alternatively, the transducer may be fabricated or integrated in a wall in situ. The method may then be used in particular for making transducers that are incorporated in the ground. Above-described step b) of forming the wall may then consist in depositing a surface layer on the ground, over the transducer. By way of example, the surface layer may be a bituminous mix layer (a mixture of aggregate and a bitumen compound binder).

Under such circumstances, the method is incorporated in the method of laying the roadway, enabling one (or more) acquisition devices to be incorporated in the roadway.

Consequently, the invention also provides a method of laying a roadway and comprising the following steps:

A) preparing a support surface; and

B) on said support surface, depositing at least one bituminous mix layer while incorporating therein at least one transducer, in such a manner that the roadway includes an acquisition device formed by a method as defined above.

In the context of the invention, the bituminous mix layer may also be constituted by any other material suitable for making a roadway, for example aggregates bound by a hydraulic binder, a bitumen binder, etc.

The method thus makes it possible to make roadways having one or more transducers incorporated therein.

The preparation step A) may consist in particular either in cleaning or scraping the top layer of an existing roadway, or in depositing a bottom roadway layer, which is generally a bituminous mix layer.

The bituminous mix layer deposited in step B) is preferably the top layer of the roadway, the layer that is deposited in the context of normal laying or repairing of the roadway. Such a roadway top layer generally extends in the travel direction of the roadway over a length of at least 10 meters on either side of the transducer. When the transducer is put into place or made while the roadway is being laid, the transducer is advantageously laid without any prior step of digging a trench in a roadway and burying the transducer in the trench.

In an implementation of the method, step A) comprises depositing a bottom bituminous mix layer, with its top surface constituting said support surface; the thicknesses of the bottom bituminous mix layer and of said at least one bituminous mix layer are such that the transducer is situated at a depth lying in the range 15% to 50% of the total thickness of said bituminous mix layers.

Furthermore, and preferably, the thickness of said at least one bituminous mix layer is a significant fraction (greater than one-tenth) of the total thickness of said bituminous mix layers of the roadway.

Advantageously, the method of laying the roadway provides good compatibility with the surrounding roadway materials (in particular in terms of shapeability, lifetime, absence of disturbing foreign bodies), making it possible to omit connections or to have connections that are stable between the measurement device and the remainder of the roadway for better overall durability.

The method is simple to perform, thereby minimizing unavailability of the roadway, and it is possible to make the transducer either in a factory at very low cost, or directly on site using steps that are simple to perform.

Finally, the method may be adapted as a function of the problems involved with tracking a road under study. The transducer may have a characteristic size varying from a millimeter to a meter; its sensitivity can be optimized by a suitable selection for the number of layers of piezoresistive material and of electrodes. Furthermore, the currents passing the transducers can be conditioned in simple and inexpensive manner, thereby facilitating simultaneous use of a large number of transducers incorporated in a single sensor, e.g. arranged in a matrix.

Below, a second aspect of the invention relates to a material suitable for making the transducer.

The transducer may in particular be a transducer that presents a variable electrical magnitude of the electrical impedance type, in particular resistance or resistivity, this magnitude being suitable for being detected and/or measured, the transducer being arranged in such a manner that the magnitude varies under the effect of a stress, e.g. a force or a deformation, that is applied to the transducer.

BACKGROUND OF THE SECOND ASPECT OF THE INVENTION

A known family of materials that are suitable for making transducers of the above-defined type are piezoresistive materials. Piezoresistive materials include in particular compositions based on carbon nanotubes. Carbon nanotubes may be dispersed within a matrix in order to form a percolating array, thereby conferring properties of conductivity and in certain circumstances of piezoresistivity for the matrix. Nevertheless, the cost of carbon nanotubes is high.

OBJECT AND SUMMARY OF THE SECOND ASPECT OF THE INVENTION

An object of the second aspect of the invention is thus to propose a low-cost material that is suitable for making a transducer of the above-defined type.

This object is achieved by a composite material having a plurality of clay particles mixed with conductive carbonaceous fibrous elements, said particles presenting an outside surface that is covered at least in part in a conductive substance.

A material or a substance is said to be conductive when its resistivity $\rho$ in ohm-meters ($\Omega \cdot m$) at 20° C. is less than 100 $\Omega \cdot m$. The conductivity of conductive carbonaceous fibrous elements and of the conductive substance is preferably less than 0.1 $\Omega \cdot m$ and more preferably less than 0.01 $\Omega \cdot m$.

Because of the conductivity properties of clay particles coated in this way and of conductive carbonaceous fibrous elements, the material as defined in this way advantageously presents the looked-for quality of presenting an impedance, and particularly (but not only) a resistance, that varies when a force is applied to the transducer.

Advantageously, the qualities of this material are obtained using low-cost components:

carbonaceous fibrous elements, which have a high price per kilogram, but can be used in quantities that are very small; and a conductive substance and particles of clay, which are or can be components of very low price.

Furthermore, as described in detail below, the material presents the looked-for properties even when it is in the form of a very thin layer. Consequently, a small volume of material suffices for making transducers of large area.

The various improvements below may be applied to the composite material of the second aspect of the invention, in isolation or in any combination:

- by way of example, the conductive substance may be a substance constituted for the most part by carbon atoms in SP2 hybridization (materials based on carbon atoms in SP2 hybridization are conductive, unlike materials based on carbon atoms in the SP3 configuration);
- the conductive substance is preferably a graphene-like substance, i.e. a substance made up for the most part out of graphene or a material of graphene type. Consequently, it is not necessarily made of a material comprising only a single layer of carbon atoms;
- the conductive substance may form a layer on the surface of the particles having mean thickness of less than 10 µm;
- the carbonaceous fibrous elements may comprise single-walled and/or multi-walled carbon nanotubes and/or carbon nanofibers; and/or
- the clay may be a fibrous clay, i.e. sepiolite and/or palygorskite.

In an embodiment, the clay particles covered at least in part in a layer of conductive substance are such that the material constitutes a composition as defined in any one of claims 1 to 12 of international patent application WO 2012/160229.

The invention also provides a transducer constituted by a body made of the above-defined material (the material possibly benefiting from some or all of the above-specified improvements), and a plurality of electrodes fastened to said body and spaced apart from one another.

The electrical impedance between the electrodes varies when the transducer is subjected to deformation, for example when a force is applied thereto.

In a preferred embodiment, the body of the transducer forms a layer, and at least one pair of electrodes of said plurality of electrodes are spaced apart from each other in a transverse direction lying substantially in a plane of the layer.

The layer may be of thickness that is less than 1 mm, or indeed 0.1 mm.

The invention also provides a display suitable for displaying varying information, and having a display surface that includes at least one transducer as defined above, in particular a transducer made using the above-mentioned preferred embodiment.

The invention also provides a method of detecting and/or measuring a force, in which a transducer as defined above is used, in particular a transducer constituting the above-mentioned preferred embodiment, and a variation in an electrical impedance determined between the electrodes of the transducer as occurs when the force is applied to the transducer is detected and/or measured.

The method may in particular be used when the variation in the electrical impedance is a variation in resistance or resistivity of the transducer under the effect of the applied force.

The invention also provides a method of preparing a material, the method comprising the following steps:

a) providing conductive carbonaceous fibrous elements;
b) mixing said elements with particles of clay in a polar liquid medium;
c) adding an organic compound suitable for being transformed into a conductive substance by being carbonized; and
d) applying carbonization heat treatment to the mixture obtained in this way.

In an implementation, the organic compound added in step c) is a substance suitable for being transformed by carbonization into a substance made up for the most part of carbon atoms in the SP2 configuration, and more particularly a substance capable of transforming into a graphene-like substance.

The organic compound added in step c) is a precursor component making it possible in step d) to form a layer of conductive substance at the surface of the clay particles.

The term "carbonization" is used to designate heating in the absence of oxygen.

The polar liquid solvent may in particularly based on water, on methanol, on ethanol, and/or on propanol.

The organic compound may in particular be a biopolymer, sugar, and/or caramel.

By way of example, the biopolymer may be selected from chitosan, alginate, pectin, guar gum cellulose, gelatin, collagen, zein, DNA, or any combination thereof.

The carbonization heat treatment serves to degrade the organic compound, and to condense it on the clay particles so that its surface becomes covered at least in part in a layer of conductive substance.

Advantageously, although the carbonaceous fibrous elements (which may in particular be carbon nanotubes) are incorporated with the clay particles as from step b), they are not destroyed and their properties are unaffected by the heat treatment of step d).

Consequently, the above-defined method makes it possible to benefit from the dispersive properties of clay particles, thus making it possible to obtain a homogeneous dispersion of carbonaceous fibrous elements.

As mentioned above, in the resulting material, the conductivity and piezoresistivity properties of carbon nanotubes are advantageously associated with the electrical conductivity properties of the conductive layer formed on the clay particles.

In an implementation of the above-defined method of preparing material, in step b), said elements may be mixed with the clay particles in particular by sonication, i.e. by subjecting the particles to ultrasound.

Advantageously, the transducer and the fabrication method present a cost that is very low, by using active materials (the carbonaceous fibrous elements) in very small quantities, and in general only in a thin layer of very small thickness.

The invention can be well understood and its advantages appear better on reading the following detailed description of embodiments given as non-limiting examples. The description refers to the accompanying drawings, in which.

Figure 1:
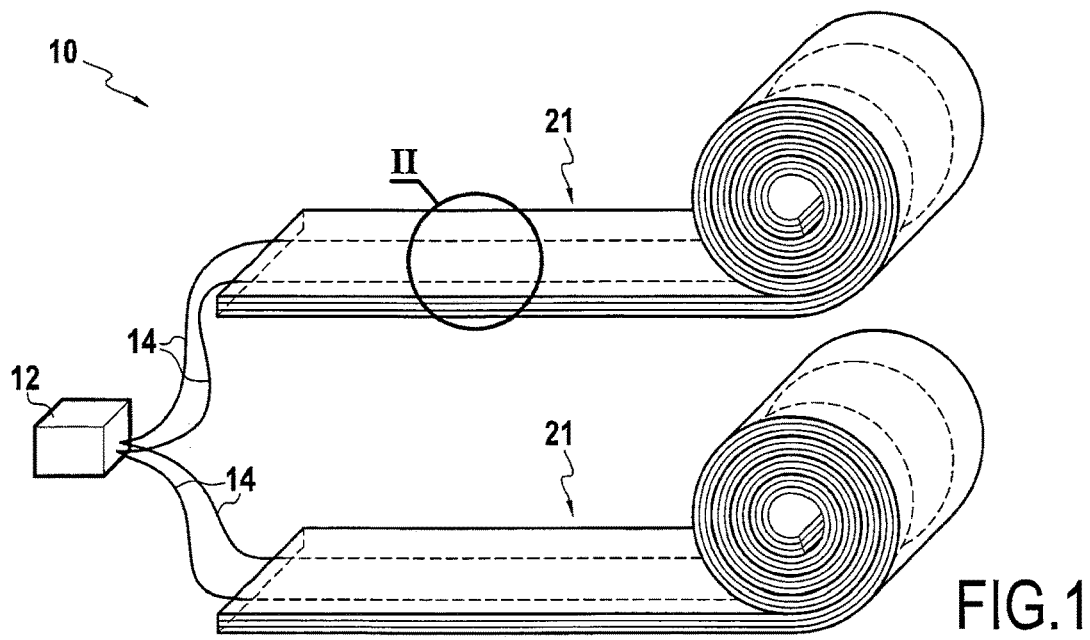
FIG. 1 is a diagrammatic perspective view showing a sensor in a first embodiment of the invention implanted in a roadway (not shown)

Elements that are identical or similar in the various embodiments are given the same numerical references.

There follows a description of a composite material in the second aspect of the invention that is particularly adapted for making transducers as defined above, but without being limited to that use only.

The composite material comprises particles of clay mixed with carbonaceous fibrous elements; the particles of clay present an outside surface that is covered at least in part in a conductive substance, preferably of the graphene-like type.

The term "carbonaceous fibrous elements" designates single-walled and/or multi-walled carbon nanotubes, and also carbon fibers.

The graphene-like substance generally forms a thin layer on the surface of the particles, or at least of some of the particles. The mean thickness of this layer may in particular be less than 10 µm. The composition of this layer is described in greater detail below while describing a method of making a layer of the composite material.

Advantageously, the layer of conductive substance present at the surface of the particles makes the particles covered in this way electrically conductive.

By way of example, this property may be verified by using a scanning electron microscope: when a conductive substance is observed with a scanning electron microscope, its surface does not present any significant accumulation of electrons, as can be seen for example on graphene, which is considered herein as being a typical example of a conductive material.

The clay may be selected in particular from fibrous clays, i.e. sepiolite and palygorskite.

In known manner, the carbonaceous fibrous elements serve to make percolating arrays that are electrically conductive. Advantageously, the above-described material makes it possible to benefit from the conductivity and percolation qualities of carbonaceous fibrous elements, but without it being necessary to use a large quantity of such elements. Specifically, in the above-defined composite material, a large portion of the conduction of electricity is provided not by the carbonaceous fibrous elements, but by the particles because of the fact that they are covered at least in part in a conductive substance.

It is thus possible to use a small quantity of carbonaceous fibrous elements since, given that they are disseminated amongst particles of clay, they constitute only a small proportion of the material.

Furthermore, the above-defined composite material may advantageously be used in a thin layer (e.g. having a thickness of a few tens of micrometers), thereby clearly limiting the quantity of carbonaceous fibrous elements used.

By way of example, a body made of the above-defined composite material may be made via the following two steps:

fabricating the composite material, which is obtained in the form of a powder; and then depositing the material on a surface and fabricating the composite material body itself on that surface.

Fabricating the Composite Material

The composite material may be made by the following steps:

a) providing carbon nanotubes (and/or linear carbon fibers);

b) dispersing the carbon nanotubes (and/or the linear carbon fibers) among particles of clay by means of a polar liquid solvent;

c) adding an organic compound suitable for transforming into a conductive substance by being carbonized, e.g. caramel;

c2) eliminating the solvent; and d) carbonizing the resulting mixture so as to transform the organic compound into a conductive substance covering at least part of the outside surfaces of the clay particles.

Steps a) and b) may be performed by way of example using a method as defined by any one of claims 16 to 20 of international patent application WO 2011/070208.

In addition, step c2) may be performed by way of example in compliance with step c) of the method defined by any one of claims 21 to 25 of international patent application WO 2011/070208.

Document WO 2011/070208 provides examples of performing methods in accordance with its claims 16 to 25.

By way of example, step d) may be performed by a method of preparing carbonaceous material as defined by any one of claims 22 to 41 of international patent application WO 2012/160229; examples of implementing such a method are given on pages 10 and 11 of that document.

An Example of Fabricating the Composite Material

The following three components are used:

clay particles: 2.5 grams (g) of particles of sepiolite;

carbonaceous fibrous elements: 50 milligrams (mg) of multi-walled carbon nanotubes (i.e. 2% by weight relative to the sepiolite); and polar liquid solvent: 43 milliliters (ml) of water.

The carbon nanotubes are obtained beforehand in independent manner by the chemical vapor deposition (CVD) method. The nanotubes are caused to grow so that they have a mean diameter of 10 nm and a mean length of 1 µm to 2 µm.

The material is then prepared as follows:

Step b) is subdivided into three individual steps b1, b2, and b3:

b1) The three above-specified components are mixed together.

b2) The resulting mixture is homogenized.

Homogenizing is performed by sonication. VIBRACELL VCX750 Sonics equipment is used with a Ti—Al—V tip having a diameter of 13 mm, operating at a resonant frequency of 20 kilohertz (kHz). The selected energy is 4.4 kilojoules (kJ), i.e. 94.3 joules per gram (J/g). 10-second pulses are applied that are spaced apart by pauses.

Homogenization by sonication may be alternated with one or more operations of working the mixture.

b3) The mixture is dried.

The mixture is dried at 60° C.-70° C. overnight.

c) An organic compound is added as a precursor, specifically 6.5 g of liquid caramel (Royal™ caramel, 80%) in a 2:1 caramel to clay weight ratio.

c2) The mixture is dried once more at 60° C.-70° C. overnight.

d) The dried mixture obtained in this way is baked:

The mixture of sepiolite, carbon nanotubes, and caramel as obtained after drying is baked at a temperature of 800° C. under a stream of nitrogen with a temperature ramp at the beginning of baking of 5° C. per minute (C/min).

The material is maintained at this temperature for 1 hour (h) in order to transform the caramel into a conductive substance.

The material is then reduced to powder by grinding, so that it can be deposited. The particles obtained by grinding preferably have largest Feret diameters with a mean value of less than 50 µm; and preferably of less than 15 µm.

The material in powder form as obtained in this way can then be deposited so as to form a piezoresistive body suitable for forming a force or deformation transducer or sensor.

Structure of the Transducer and of the Sensor

In order to make the body of a transducer in the first aspect of the invention, any piezoresistive material (but not only such materials) can be used. It is possible in particular to use the composite material comprising clay particles mixed with conductive carbonaceous fibrous elements as described above.

Preferably a material is used that is suitable for forming a layer, and in particular a thin layer.

The body of the transducer may form a layer that is continuous (without holes). It may also form a layer that includes holes and/or discontinuities, it being specified that it is preferable for there to exist at least one continuous path passing through the body of the transducer and connecting the various electrodes one to another.

The material of the body of the transducer is preferably constituted by a piezoresistive material selected so that the resistance between two measurement points (where the electrodes are placed) varies strongly when a force is applied to the body of the transducer in a direction perpendicular to the direction connecting together the two measurement points.

The material may in particular be constituted by a percolating array of micro- or nano-particles (particles having at least one characteristic dimension that is less than 100 µm or 100 nm, respectively) or by a percolating array constituted by a mixture of different types of micro- or nano-particle.

Particles that are more particularly suitable are as follows:

a) carbon nanotubes in a random or an organized array;

b) self-assembled micro- or nano-particles;

c) sheets of graphene, graphite, or optionally reduced graphene oxide;

d) various combinations of the above components when mixed together; or e) a piezoresistive polymer or a mixture of various piezoresistive polymers; or f) a mixture of one or more polymers with conductive micro- and nano-particles (nano-particle polymer composites); or g) a mixture of bituminous mix or bitumen with micro- and nano-particles (intelligent bituminous mix).

The body of the transducer may in particular be made out of the above-described composite material comprising clay particles and fibrous carbonaceous elements.

The ability of the material to present resistance that varies in a specific direction (along which the measurement points are arranged) can be increased by encouraging a certain orientation for the micro- or nano-particles in the piezoresistive body. By way of example, this may be done by dielectrophoresis for particles that present a dipole moment. Thus, a transducer using such a material presents increased sensitivity to any force giving rise to deformation in the above-specified specific direction.

A force sensor 10 in a first embodiment of the invention is described below with reference to FIGS. 1 to 7.

The sensor 10 has a set of identical acquisition devices 20 and an ohmmeter 12 constituting an impedance-determining device.

Each device 20 is connected to the ohmmeter 12 by two electric wires 14.

Figure 2:
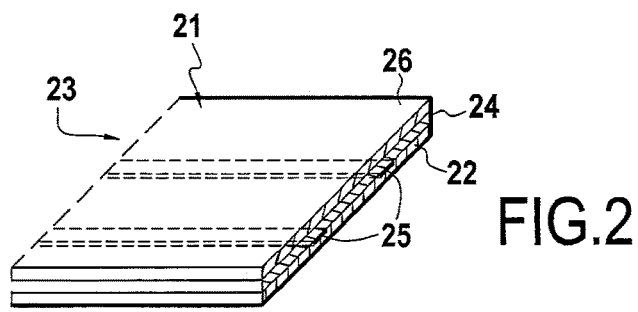
FIG. 2 is a fragmentary diagrammatic view in perspective of the sensor shown in FIG. 1.

Each device 20 mainly comprises a tape 21 having the same structure along its entire length (in FIGS. 1 and 2, only the tapes 21 are shown in the devices 20).

Each tape 21, which itself constitutes an acquisition device in the meaning of the invention, is mainly constituted by a middle layer 24 clamped between two bonding layers 22 and 26 that are constituted as follows:

a bottom bonding layer 22 and a top bonding layer 26 that are identical, each being constituted by a flexible plastics film; and a central piezoresistive layer 24 constituted by piezoresistive material, constituting the body of a transducer in the meaning of the invention.

Each device 20 is normally put into place in such a manner as to be laid flat on a horizontal plane. Each of the three layers is then in the form of a horizontal plane.

In the thickness of each tape 21 there are also received two electrodes 25. Each electrode is constituted by a thin flat silver wire interposed between the bottom bonding layer 22 and the piezoresistive layer 24. The electrodes 25 are fastened to the piezoresistive layer 24 and they are secured thereto. The layer 24 associated with the electrodes 25 thus constitutes a transducer 23. Specifically, because of the piezoresistive properties of the layer 24, in the event of the transducer 23 deforming, the resistance between the electrodes 25 varies.

The surface of the piezoresistive layer 24 that lies generally between the two electrodes and that is involved in determining the impedance between the electrodes is referred to as the "active" surface.

The size and the shape of the active surface are selected as a function of the intended use for the device 20 (local tracking of deformation or damage in a roadway; detecting or statically or dynamically weighing vehicles, . . . ). This active surface may be of very small area (e.g. less than 1 square centimeter ($cm^2$)) or it may have an area of as much several square meters ($m^2$).

The active surface may be of any shape, it may be isotropic (e.g. circular or square) or anisotropic (e.g. elliptical or rectangular).

Figure 3:
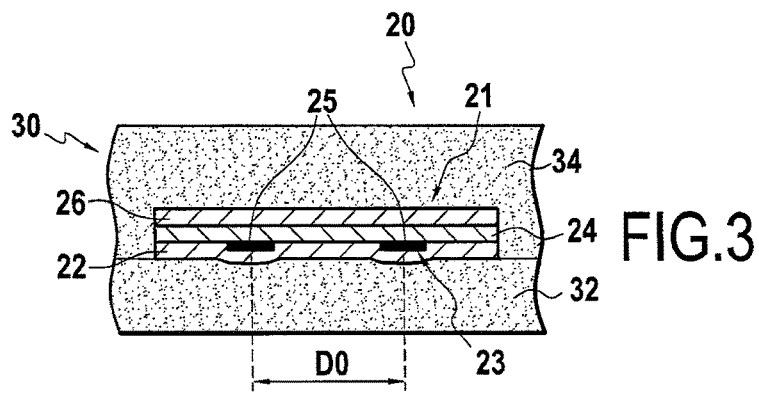
FIG. 3 is a diagrammatic view in section of a roadway having incorporated therein the acquisition device shown in part in FIG. 2, the view being shown in the absence of a vehicle.

An example of an acquisition device 20 installed in a roadway is shown in FIG. 3.

This figure is a section on a vertical plane showing a roadway 30 in which the device 20 is incorporated. The roadway 30 is constituted by a bottom layer 32 and a top layer (also called a transfer layer) 34, both of which are made of bituminous mix. The layers 32 and 34 rest on ground that is not shown. The tape 21 is arranged between the two roadway layers 32 and 34.

Each device 20 is constituted by the roadway portion situated in the vicinity of the tape 21, and thus comprises a portion of the layer 32, the tape 21, and a portion of the layer 34.

In FIG. 3, in the transducer 20 the electrodes 25 are arranged under the piezoresistive layer 24. It is also possible to arrange the electrodes 25 above this layer, or indeed inside the piezoresistive layer (as an example transducer body).

The top layer 34 constitutes a wall presenting a free top surface 36. The transducer 23 is incorporated under the surface 36. When looking in a direction perpendicular to the surface 36, i.e. in a vertical direction (arrow A, FIG. 4), the electrodes 25 are seen to be separate from each other. They are placed at the same depth in the roadway 30, advantageously making it possible for the device 20 to be of small thickness.

The bonding layers 22 and 26 may be made of two-component silicon elastomer or of poly(ethylene-co-tetrafluoroethylene), also known as ethylene tetrafluoroethylene (ETFE).

These materials present good adhesion with the bitumen of the bottom and top layers 32 and 34 of the roadway. Because of this adhesion, during deformation of the roadway 30, the sensor 20 accompanies that deformation without any delamination or internal cracks appearing in the roadway at the interfaces between the transducer 23 and the roadway layers 32 and 34.

Nevertheless, neither the bottom bonding layer 22 nor the top bonding layer 26 is itself necessary to enable a device of the invention to operate.

Furthermore, each of these layers may itself be constituted by one or more sub-layers. For example, it is possible to use a two-material bonding layer, i.e. made up of two sub-layers, each being made of a specific material: the material of the sub-layer that comes into contact with the piezoresistive layer 24 may be selected to adhere strongly therewith, and the material of the sub-layer that comes into contact with the roadway material (layer 32 or 34) may be selected to adhere strongly with the roadway material.

Figure 4:
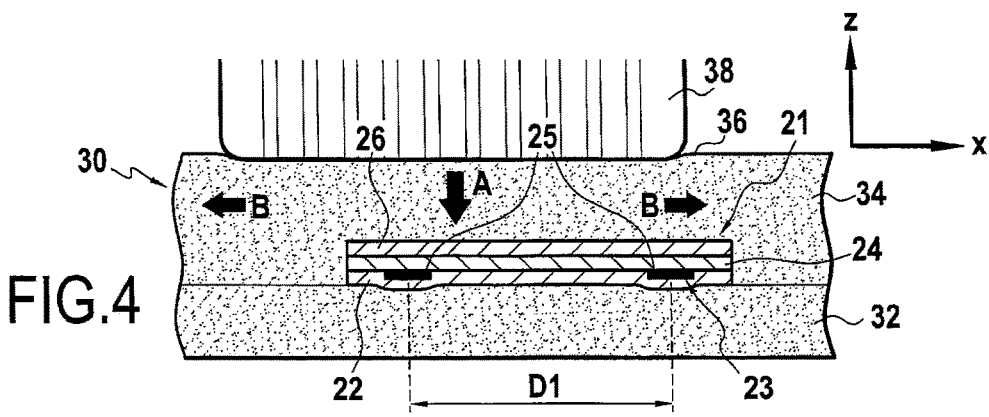
FIG. 4 is the same diagrammatic section view of a roadway as FIG. 3, the view being shown while a vehicle is passing.

Although FIG. 3 shows the road portion 30 at rest, FIG. 4 shows the same road portion while a vehicle is passing.

A portion of a vehicle tire 38 is shown. The tire 38 exerts a pressure force on the top surface 36 of the roadway in the vertical direction Z. Under the effect of this force, the roadway 30 deforms: it becomes compressed (arrow A), and the bituminous mix of the roadway moves sideways a little in the lateral direction X, horizontally and parallel to the surface 36 of the roadway (arrows B).

At rest (FIG. 3), the electrodes 25 are spaced apart from each other in the direction X by a distance D0, which is of the order of a few centimeters. When a truck passes (FIG. 4), the roadway deforms. The electrodes 25 follow the deformation of the bituminous mix constituting the roadway and they move apart from each other: while the vehicle is passing, the distance between them takes a value D1 that is strictly greater than the value D0.

Figure 5:
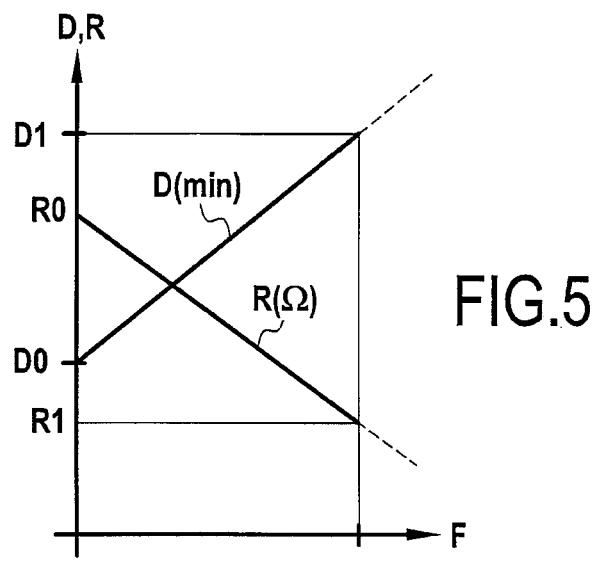
FIG. 5 is a diagram plotting curves for variation in the distance between electrodes and resistance in an acquisition device of the invention.

The piezoresistive material of the layer 24 is selected in such a manner as to present resistance between the electrodes that varies as a function of the distance between the electrodes. This operation is shown in FIG. 5. It is represented by two curves that are functions of the force F (weight of the vehicle) applied to the roadway 30:
  the first curve shows the increase in the thickness D between the electrodes (going from D0 to D1; and
  the second curve applies to the same increase in force and shows the decrease in the resistance R between the electrodes 25.

Consequently, when the vehicle passes, the resistance between the electrodes 25 varies. This change of resistance is measured by the ohmmeter 12. Thus, as a function of the resistance measured between the electrodes 25, the ohmmeter 12 can detect and measure the force applied in the vertical direction in register with the electrodes 25.

This curve shows that in this embodiment, the transducer 23 deforms under the effect of the weight of the truck (of the applied force) in such a manner that the electrodes 25 move apart laterally; and that under the effect of moving apart in this way the resistance between the electrodes decreases.

The acquisition devices shown in FIGS. 1 to 7 comprise electrodes 25 that are made of a material that is flexible, specifically they are made of a thin layer of silver.

With such electrodes made of a material that is flexible or out of a material of analogous stiffness, the transducer behaves as follows: if a force is applied to the acquisition device in a direction perpendicular to the surface of the wall, the transducer deforms mainly in a plane that is substantially parallel to the surface of the wall, and an impedance measured between the electrodes of said plurality of electrodes varies.

Note: the figures are not drawn to realistic scales. In the figures, height (dimension along the axis Z) is expanded in order to facilitate understanding. In reality, the transducer 20 is of very small thickness. The bottom and top layers 22 and 26 each have a thickness of 0.4 mm. The piezoresistive layer 24 has a thickness lying in the range 0.01 mm to 0.05 mm.

Nevertheless, a sensor of the invention can operate in different manner. Entirely different operation can be obtained by selecting electrodes that are rigid.

Specifically, if electrodes 25 are used that are made of a rigid material, e.g. copper or a material of analogous stiffness, the transducer behaves as follows: if a force is applied to the acquisition device 20 in the vertical direction perpendicular to the surface 36, the transducer, and in particular the body of the transducer (piezoresistive layer 24) deform essentially in the same direction (vertical); it is this compression that varies the resistance of the layer 24 between the electrodes 25.

Figure 6:
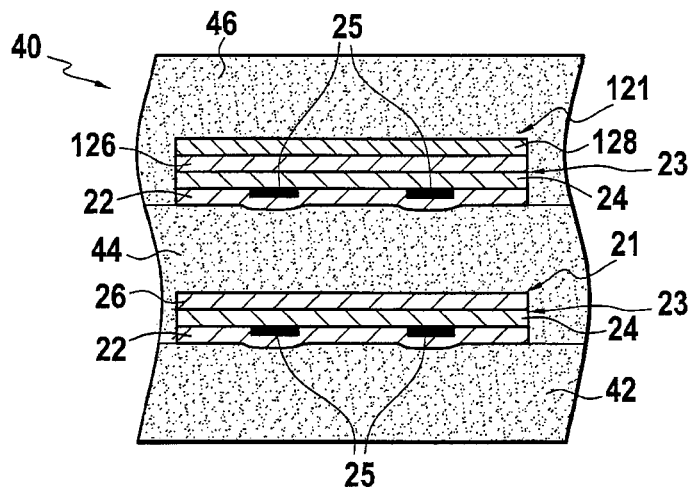
FIG. 6 is a diagrammatic section view of a roadway fitted with an acquisition device of the invention and having two transducers.
Figure 7:
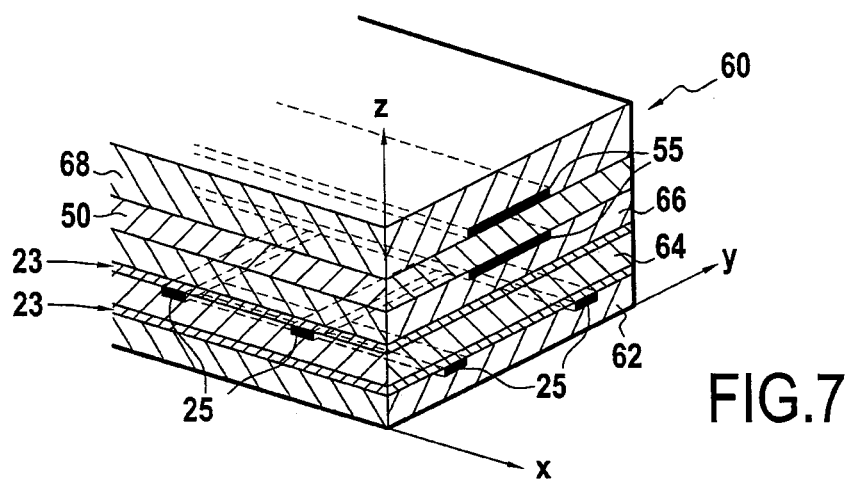
FIG. 7 is a diagrammatic perspective view of a roadway fitted with an acquisition device of the invention and having three transducers.

Another example of installing transducers 20 in a roadway is shown in FIG. 6. This figure is a section of a roadway comprising an acquisition device 40 including two transducers 23 placed one above the other (in the vertical direction Z).

Ignoring the bonding layers (which are described in greater detail below), the acquisition device 40 is constituted in succession, starting from the bottom, by a bottom layer 42 made of bituminous mix, by a bottom transducer 23, by a second layer 44 of bituminous mix, by a top transducer 23, and by a top layer 46 likewise made of bituminous mix, and constituting a wall having a top surface that is free. The bottom transducer 23 is interposed between the two bituminous mix layers 42 and 44; the top transducer 23 is interposed between the bitumen layers 44 and 46. This configuration makes it possible to have information about the magnitude of the deformation of the roadway as a function of depth. It is possible to increase the number of transducers arranged in the ground one above another.

The two transducers 23 are not installed in the acquisition device 40 in the same manner.

The bottom transducer 23 is clamped between two bonding layers 22 and 26 and forms part of a tape 21 identical to that described with reference to FIGS. 1 to 4.

Conversely, the transducer 23 forms part of a tape 121 comprising a bottom bonding layer 22, the transducer 23, and a top bonding layer made up of two sub-layers 126 and 128. The sub-layer 126 is selected to provide good adhesion with the piezoresistive layer 24, and for example it is made of ETFE; the top sub-layer 128 is selected to have good adhesion with the bituminous mix of the layer 46, and is formed by way of example out of two-component silicone elastomer.

Furthermore, depending on the information that it is desired to acquire about deformation of the roadway (or of the material in which the acquisition device is placed), the electrodes may be placed in various orientations:

Thus, in one embodiment of the invention (FIG. 7), two transducers 23 of the invention and a third transducer 50 are installed in a roadway 60. Starting from the bottom, the roadway 60 is made up of four (horizontal) parallel layers 62, 64, 66, and 68 of bituminous mix.

Each of the first and second transducers 23 is constituted by a layer of piezoresistive material 24, and by two electrodes 25 that are secured to this layer of material and that are spaced apart from each other in the plane of this layer. The first and second transducers 23 are arranged respectively between the layers 62 and 64, and between the layers 64 and 66. The first transducer 23 is arranged in such a manner that the electrodes 25 extend parallel to each other in the direction X: they are situated at a distance apart from each other in the direction Y. Conversely, the second transducer 220 is arranged in such a manner that the electrodes 25 extend parallel to each other in the direction Y: they are at a distance apart from each other in the direction X.

The third transducer 50 is constituted by a layer of piezoresistive material and by two electrodes 55. The electrodes 55 are placed respectively above and below the piezoresistive material layer of the transducer 50. Thus, seen in the vertical direction, the electrodes 55 are not spaced apart from each other.

Because of the specific arrangement of the transducers 23 and 50, it is possible to measure deformations of the roadway in all three directions X, Y, and Z simultaneously.

Figure 10:
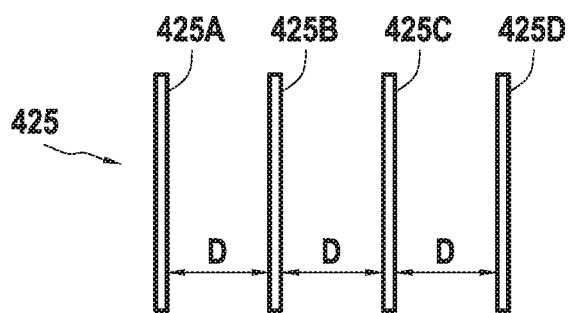
FIG. 10 is a fragmentary diagrammatic view from above of an acquisition device in another embodiment of the invention.

FIG. 10 shows another embodiment of the acquisition device of the invention.

In this device, the transducer has four elongate electrodes 425A, 425B, 425C, and 425D (referred to collectively as the electrodes 425), which electrodes are arranged parallel to one another and are spaced apart by equal distances in a plane that is substantially parallel to the surface of the wall.

A so-called "4-point" measurement is performed:

An electric current is passed between the two electrodes that are furthest apart (the "outer" electrodes) 425A and 425D;

The voltage between the "inner" electrodes 425B and 425C is measured.

The impedance is calculated as the ratio between the current imposed between the outer electrodes and the voltage measured between the two inner electrodes.

After correction for geometrical effects, the resulting value is referred to as the sheet resistance (or 'square resistance') of the transducer.

The resistivity of the piezoresistive material is then obtained by multiplying the sheet resistance by the mean thickness of the body of the transducer.

Advantageously, it is also possible to deduce the contact resistance of the electrodes from the resistivity of the material or from the sheet resistance.

The use of the sheet resistance or the resistivity as the output value from the sensor serves to minimize the sensitivity of the transducer to the behavior of the electrodes, e.g. in the event of the contact degrading the quality of the measurement (e.g. over time).

The use of contact resistance as the output value from the sensor serves to maximize its sensitivity to the behavior of the electrodes, e.g. when the relative movement between the electrodes and the piezoresistive body is a major cause of the piezoresistivity phenomenon.

Figure 11:
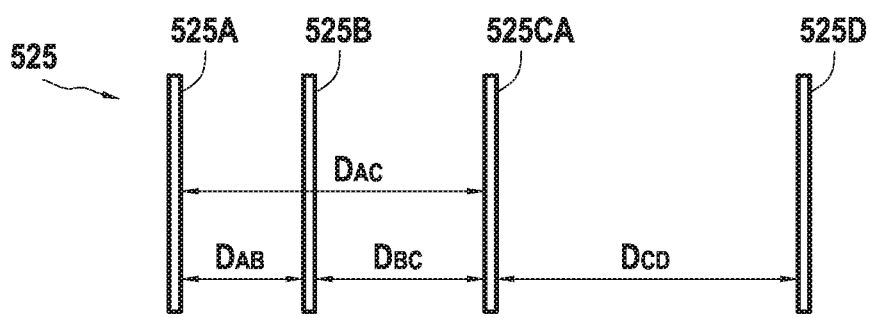
FIG. 11 is a fragmentary diagrammatic view from above of an acquisition device in another embodiment of the invention.
Figure 12:
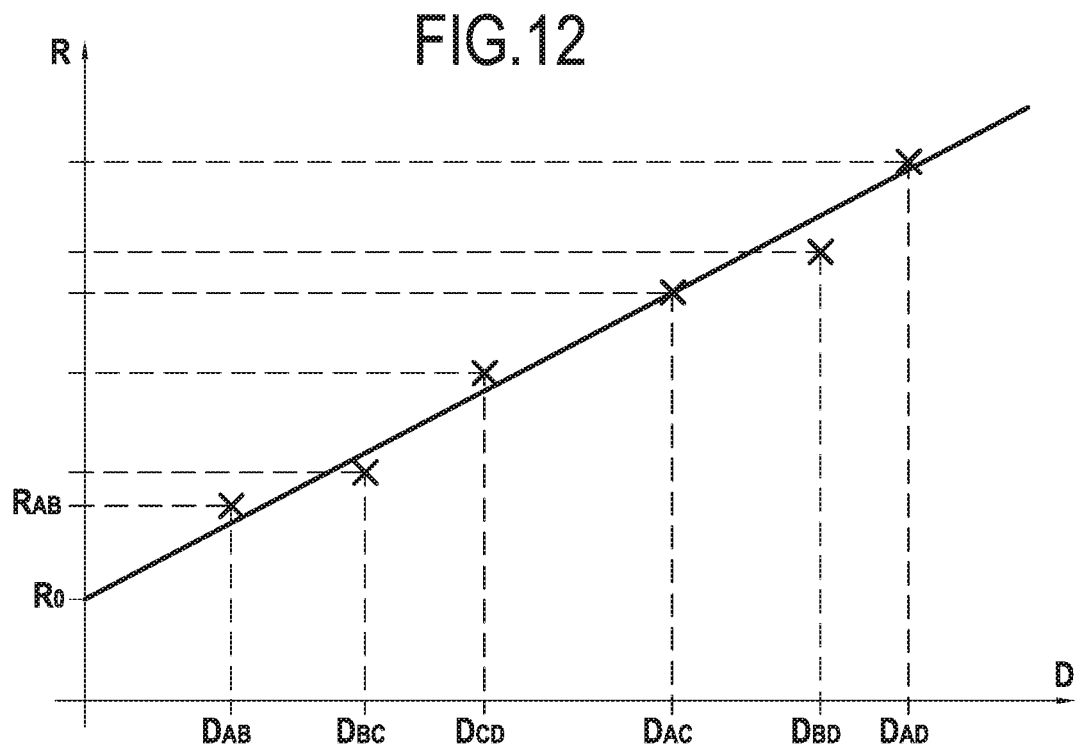
FIG. 12 is a diagram plotting the curve for resistance between electrode pairs as a function of the spacing between electrode pairs, in the FIG. 11 device.

FIGS. 11 and 12 show another embodiment of the acquisition device of the invention.

In this device, a plurality of electrodes are arranged in parallel, there being at least three and preferably more than four electrodes, with the distance D between electrodes increasing. Specifically, four electrodes 525A, 525B, 525C, and 525D are shown, which are referred to collectively as the electrodes 525.

A transmission line measurement (TLM) type measurement is performed, i.e. the resistance R is measured between the various pairs of electrodes, i.e. a set of resistances Rij measured between the various pairs of electrodes 525*i*-525*j*.

The slope of the line plotting resistance R as a function of spacing D between electrode pairs, after correction for geometrical factors, gives the resistivity or the sheet resistance; the ordinate intercept at the origin gives the contact resistance R0.

A sensor of the invention mainly comprises one or more transducers as described above connected to an impedance-determination system, e.g. the above-described ohmmeter 12, that serves to measure the resistance of the piezoresistive layer between the electrodes of the various transducers.

The impedance-determination system may include a conventional signal conditioning system. For example a transducer (or two transducers for automatic temperature decorrelation) may be interposed in a Wheatstone bridge that also has three (or two) other resistances (that are preferably temperature stable). The measurement is then taken by applying the voltage delivered by a voltage source in the range 3 volts (V) to 10 V; readings are taken by an acquisition system of the instrumental amplifier type, with filtering, offset correction, and analog-to-digital conversion. The analog portion of the system is optionally associated with means for taking measurements remotely, e.g. means for compensating for resistive losses in wires when the measurement system is remote from the sensor, and with a calibration shunt.

Any other conventional system for acquiring and digitizing a variable resistance may be suitable, and in particular systems that propose techniques for providing temperature compensation. Alternatively, the variable resistance may be placed in a sigma-delta type system in order to perform analog-to-digital conversion simultaneously with reading the value of the resistance.

In order to make a force sensor, the sensor also includes a correlation system (also represented by the unit 12) for determining the deformation of the transducer(s), and/or the force(s) applied to the wall, on the basis of the impedance of the transducer(s) and/or of variations therein, as measured by the impedance-determination system.

When the sensor has a plurality of transducers, they may in particular be organized in a matrix array.

When a sensor is used for weighing vehicles, the impedance-determination system (the ohmmeter) and possibly also the correlation system is/are preferably remote from the road side. Such systems may also be made out of flexible material and given suitable packaging for placing beneath or above the layer of piezoresistive material of the transducers, or in the core of the bituminous mix, or in a bonding layer.

Once the signal from one or more transducers has been digitized, the signal may be processed on site or elsewhere and may be transmitted by any appropriate transmission means, e.g. to an acquisition center, a data logger, an optionally independently powered radio communication node, a radio frequency identity (RFID) tag, etc.

Figure 13:
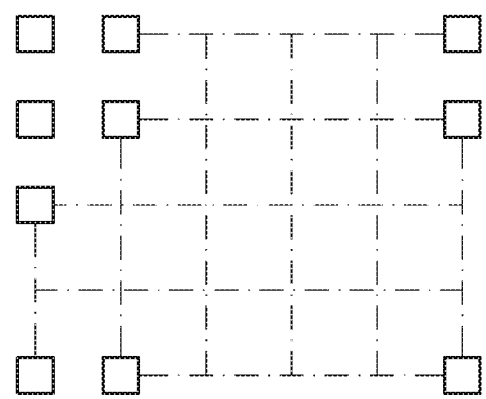
FIG. 13 is a diagrammatic view of an array of transducers for a sensor.

FIG. 13 shows an embodiment of an array of transducers for a sensor in which the transducers are arranged to form a matrix.

Fabrication: The Piezoresistive Body, the Acquisition Device, the Sensor

Fabricating the piezoresistive body is the main step in making an acquisition device of the invention. Various methods may be used for this step. The method selected depends on the desired piezoresistive material and on the site where the method is to be performed (in a factory or on a work site).

Certain types of piezoresistive material may be deposited in the vapor phase (evaporation, chemical or physical deposition) on a support surface. This operation may be performed on site (in situ fabrication) or in a factory.

Nevertheless, it may be preferable to use liquid deposition for the components of the material. Such deposition may be performed in a factory or on site.

The mode of operation may be as follows:

i) The piezoresistive material, after previously being reduced to a powder, is put into solution in a solvent.

This may be done using conventional techniques (e.g. magnetic stirring, sonication in an ultrasound bath or using a tip, possibly centrifuging, . . . ). The solvent is preferably, but not necessarily, aqueous; the properties of the solvent may be optimized, where appropriate, by using additives (e.g. surface-active agents) suitable for improving the quality of deposition (e.g. its uniformity).

ii) The solution obtained in this way is deposited on the surface on which the piezoresistive body (or layer) is to be formed.

This deposition may be performed using conventional techniques. The technique used should be selected as a function of the physiochemical properties of the solution and of the surface that is to be covered, of requirements for uniformity, of possible time constraints, and of the site where the method is performed. Deposition may for example be performed by ink jet printing, by dropping drops, by spraying, by a spin coater, or by paintbrush.

iii) The solvent is eliminated.

This operation is performed by any known method, in particular by natural or forced evaporation.

An acquisition device such as the device 20 (FIG. 3) is fabricated in several steps:

A) A support surface is prepared onto which the roadway is to be made.

B) The roadway is made with the acquisition device being incorporated therein.

Step B) comprises several stages:

i) the bottom bituminous mix layer 32 is deposited;

ii) the bottom bonding layer 22 is deposited on the top surface of the layer 32 so that the layer 22 adheres to the layer 32;

iii) the pair of electrodes 25 is put into place on the layer 22, being spaced apart in the horizontal direction (X, FIG. 4);

iv) the piezoresistive layer 24 of piezoresistive material is formed on the layer 22 and on the electrodes 25;

v) the top bonding layer 26 is deposited on the piezoresistive layer 24 so that the bonding layer 26 adheres to the piezoresistive layer 24; and vi) the top bituminous mix layer 34 is then deposited on the bonding layer 26.

An acquisition device having the same structure as the device 20 (bottom layer, bonding layer, piezoresistive layer, bonding layer, and top or transfer layer) may be fabricated in a factory. Under such circumstances, the transducers may in particular be fabricated as a tape (of plastics material), as applies for the tape 21 shown in FIG. 1. The bottom and top layers 22 and 26 are then films or plates made of plastics material. Preparation as a tape makes it easier subsequently to put the transducer into place, in particular when several transducers are put into place or positioned together.

Alternatively, the acquisition device may also be fabricated directly in situ. This mode of fabrication is particularly suitable for making sensors for dynamically weighing vehicles. Under such circumstances, fabrication of the acquisition device may in particular be incorporated in the normal operations for laying the roadway. Incorporating the acquisition device within the roadway serves to give the roadway an additional function (dynamically weighing vehicles), and does so at a cost that is extremely low.

In order to make a sensor, it then suffices to connect the acquisition device obtained by the above method to an impedance-determination system, e.g. an ohmmeter, itself optionally connected to a system for determining the deformation or the force, if it is desired to obtain a deformation or a force directly as the output value.

A plurality of transducers may optionally be connected to the same impedance-determination system.

Figure 8:
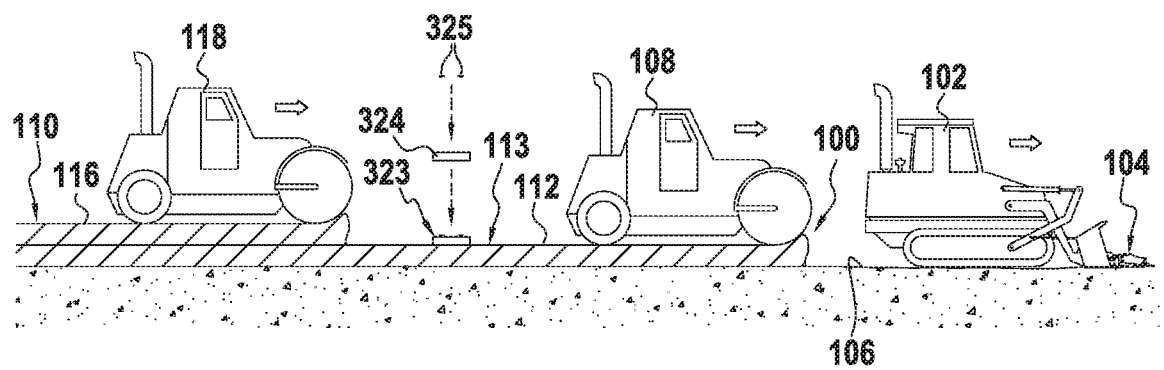
FIG. 8 is a diagrammatic view showing the steps performed in a method of laying a roadway of the invention.
Figure 9:
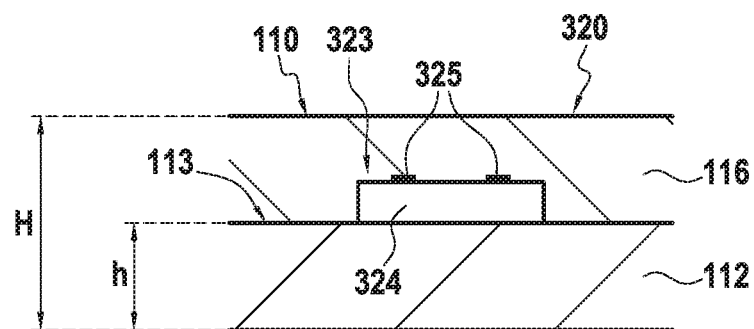
FIG. 9 is a diagrammatic section view of the roadway obtained by implementing the method shown in FIG. 8.

A major application of the above-described sensors lies in making sensors incorporated in roadways for the purpose of detecting, counting, and weighing vehicles, or indeed of tracking deformation of the roadway. By way of example, a roadway incorporating such a sensor may be laid as follows (FIGS. 8 and 9):

Cleaning the Road

A scraper 102 is passed to scrape off the surface layer 104 from a road 100. This operation reveals a scraped surface 106 on which a new roadway 110 can be laid.

Laying a First Bituminous Mix Layer

On the surface 106, a first bituminous mix layer 112 is laid and smoothed with a road roller 108. The top surface 113 of the bituminous mix layer 112 constitutes a support surface ready to receive the transducer.

In Situ Fabrication of the Acquisition Device

It is possible to use a transducer that has been prefabricated in a factory. In above-described step iv), it then suffices to position the transducer on the top surface 113 of the layer 112.

Alternatively, the transducer may be fabricated directly in step iv) on the surface of the bituminous mix layer 112, as follows:

- a composite material powder comprising clay particles covered at least in part in a conductive substance is used together with nanotubes of the above-specified type;
- the powder is diluted in water so as to obtain an aqueous solution having 0.5% by weight of composite material;
- a few drops of the aqueous solution are deposited on the still hot compacted bituminous mix constituting the bituminous mix layer 112;
- thereafter, two electrodes 325 are put into place that are spaced apart from each other by a few centimeters, so that each electrode is in contact with the zone on which the aqueous solution has been poured;
- the water is evaporated, initially freely and subsequently with a paint burner that blows a stream of air that has been heated to about 200° C. onto the aqueous solution.

This produces a transducer body 324 made of piezoresistive material that is formed on the surface 113 of the bottom layer 112. The body 324 associated with the electrodes 325 forms a transducer 323. The portion of roadway including the layer 112, the transducer 323, and the layer 116 forms an acquisition device 320.

This implementation does not involve laying any bonding layer for bonding the transducer 323 to the neighboring layers.

Laying a Second Bituminous Mix Layer

A second bituminous mix layer 116 is then laid on the first layer 112 and on the transducer 323, and the second layer is smoothed with a roller 118.

In this implementation, the layer 116 is formed directly on the piezoresistive layer 324 on which the electrodes 325 have been fastened.

The operations of putting the transducer into place are thus incorporated in the normal procedure for laying the roadway 11.

The thicknesses of the layers 112 and 116 are preferably selected so that the transducer 323 is situated at a depth h lying in the range 15% to 50% of the thickness H of the roadway 110.

Naturally, methods other than those described above may be performed while remaining within the ambit of the invention. In particular, a roadway may be made up of more than two layers. A transducer of the invention may preferably be placed between two layers. In alternative manner, it is also possible for it to be installed with the bituminous mix of a single layer.

The invention claimed is:

1. A roadway sensing system, comprising:
   a roadway having a free top surface;
   a plurality of acquisition devices embedded in material forming the roadway so that each one of the acquisition devices is disposed under the free top surface and spaced apart from one another with the material disposed between each one of the acquisition devices, and
   an impedance-determining device electrically connected to each one of the acquisition devices; wherein,
   each one of the acquisition devices is an elongated tape that includes:
      a top bonding layer formed from a flexible plastic material;
      a bottom bonding layer underneath the top bonding layer, the bottom bonding layer is formed from a flexible plastic material; and
      a transducer;
   for each one of the acquisition devices, the transducer comprises:
      a piezoresistive layer between the top bonding layer and the bottom bonding layer, the piezoresistive layer comprising a piezoresistive material; and
      at least two electrodes disposed on and secured to the piezoresistive layer, the at least two elongated electrodes are spaced apart from each other a uniform distance.

2. The roadway sensing system of claim 1, wherein for each one of the acquisition devices, the at least two electrodes are arranged on a bottom of the piezoresistive layer.

3. The roadway sensing system of claim 1, wherein for each one of the acquisition devices, longitudinal side edges of the at least two electrodes are completely encapsulated by the piezoresistive layer and the bottom bonding layer.

4. The roadway sensing system of claim 1, wherein the acquisition devices are arranged in a common horizontal plane.

5. The roadway sensing system of claim 1, wherein the acquisition devices are arranged so that one of the acquisition devices is vertically above the other acquisition device.

6. The roadway sensing system of claim 1, wherein for each one of the acquisition devices, the bottom bonding layer, the top bonding layer and the piezoresistive layer have widths that are the same as each other.

7. The roadway sensing system of claim 1, wherein the transducers of the acquisition devices are arranged in an array so as to form a bi-dimensional matrix.

8. A roadway acquisition device, comprising:
   an elongated tape that includes a top bonding layer formed from a flexible plastic material; a bottom bonding layer underneath the top bonding layer, the bottom bonding layer is formed from a flexible plastic material; and a transducer;
   the transducer comprising a piezoresistive layer and at least two electrodes;
   the piezoresistive layer being between the top bonding layer and the bottom bonding layer, and comprising a piezoresistive material;
   the at least two electrodes being disposed on and secured to the piezoresistive layer, the at least two elongated electrodes are spaced apart from each other a uniform distance.

9. The roadway acquisition device of claim 8, wherein the at least two electrodes are arranged on a bottom of the piezoresistive layer.

10. The roadway acquisition device of claim 8, wherein longitudinal side edges of the at least two electrodes are completely encapsulated by the piezoresistive layer and the bottom bonding layer.

11. The roadway acquisition device of claim 8, wherein the bottom bonding layer, the top bonding layer and the piezoresistive layer have widths that are the same as each other.

12. The roadway acquisition device of claim 8, wherein a thickness of the piezoresistive layer is less than one-tenth of at least one other characteristic dimension of the piezoresistive material.

13. The roadway acquisition device of claim 8, wherein the piezoresistive material:
   includes a percolating array of micro- and/or nano-particles, said micro- and/or nano-particles comprising one or more particles selected from:
      a) self-assembled micro- or nano-particles;
      b) sheets of graphite, or optionally-reduced graphene oxide; and
      c) particles of clay, part of the particles presenting an outside surface that is covered at least in part in a conductive substance; or
   includes a mixture of bituminous mix or of bitumen with micro- and nano-particles.

14. The roadway acquisition device of claim 13, wherein the micro- or nano-particles are oriented along a specific direction.

15. The roadway acquisition device of claim 8, wherein the piezoresistive material comprises a piezoresistive polymer or a mixture of a plurality of piezoresistive polymers.

16. A roadway portion comprising:
   a roadway acquisition device incorporated under or at a surface of the roadway portion, the roadway acquisition device includes:
   an elongated tape that includes a top bonding layer formed from a flexible plastic material; a bottom bonding layer underneath the top bonding layer, the bottom bonding layer is formed from a flexible plastic material; and a transducer;
   the transducer comprises a piezoresistive layer and at least two electrodes; the piezoresistive layer being between the top bonding layer and the bottom bonding layer, and comprising a piezoresistive material; the at least two electrodes being disposed on and secured to the piezoresistive layer, the at least two elongated electrodes being spaced apart from each other a uniform distance.

* * * * *